US 8,512,113 B2

(12) United States Patent
Castrén et al.

(10) Patent No.: US 8,512,113 B2
(45) Date of Patent: Aug. 20, 2013

(54) AIR CONDITIONING DEVICE

(75) Inventors: Markus Castrén, Lahti (FI); Risto Castrén, Lahti (FI)

(73) Assignee: Retermia Oy, Heinola (FI)

( * ) Notice: Subject to any disclaimer, the term of this patent is extended or adjusted under 35 U.S.C. 154(b) by 922 days.

(21) Appl. No.: 12/474,040

(22) Filed: May 28, 2009

(65) Prior Publication Data

US 2010/0136896 A1    Jun. 3, 2010

(30) Foreign Application Priority Data

May 30, 2008 (FI) .................................... 20085531

(51) Int. Cl.
*F24F 7/06* (2006.01)
(52) U.S. Cl.
USPC ............ 454/228; 454/233; 454/235; 454/236
(58) Field of Classification Search
USPC ............... 454/184, 141, 200, 234, 237, 241, 454/242, 243, 244, 249, 251, 253, 261, 264, 454/345, 347, 354, 151; 165/10, 122, 184, 165/48.1, 59, 6, 66, 7; 62/271, 419, 427, 62/526
See application file for complete search history.

(56) References Cited

U.S. PATENT DOCUMENTS

| | | | | |
|---|---|---|---|---|
| 2,279,271 A * | 4/1942 | Williams | ...................... | 454/203 |
| 2,781,717 A * | 2/1957 | Hord | ............................. | 454/203 |
| 2,975,227 A * | 3/1961 | Wiater et al. | .................. | 174/559 |
| 3,350,862 A | 11/1967 | Nutting | | |
| 4,158,386 A * | 6/1979 | Hapgood | ...................... | 165/48.1 |
| 4,936,101 A * | 6/1990 | Heberer et al. | ................. | 62/263 |
| 5,121,613 A * | 6/1992 | Cox et al. | ......................... | 62/419 |
| 5,454,231 A * | 10/1995 | Bolton et al. | .................... | 62/262 |
| 5,826,641 A * | 10/1998 | Bierwirth et al. | ............ | 165/48.1 |
| 5,839,288 A * | 11/1998 | Dotson | ............................. | 62/94 |
| 5,950,446 A * | 9/1999 | Tromblee et al. | ............... | 62/262 |
| 6,116,048 A * | 9/2000 | Hebert | ............................. | 62/525 |
| 6,378,605 B1 * | 4/2002 | Kutscher et al. | .............. | 165/181 |
| 2003/0192331 A1 * | 10/2003 | Alford | ............................ | 62/173 |
| 2008/0196433 A1 | 8/2008 | Castrén | | |

FOREIGN PATENT DOCUMENTS

| | | |
|---|---|---|
| FI | 841042 A | 9/1985 |
| FI | 75423 B | 2/1988 |
| FI | 75663 B | 3/1988 |
| JP | 55043310 A * | 3/1980 |

OTHER PUBLICATIONS

Search Report issued in FI 20085531.
"Hydrocell Lämmöntalteenotto", web page printout, http://www.hydrocell.fi/fi/lammonsiirtimet/lammontalteenotto.html Nov. 2005.

(Continued)

*Primary Examiner* — Steven B McAllister
*Assistant Examiner* — Jamil Decker
(74) *Attorney, Agent, or Firm* — Stiennon & Stiennon

(57) ABSTRACT

An air conditioning device (10) for conducting air from outside into a building or in the opposite direction for conducting air out of the building has at least one supply air chamber structure (11) and at least one exhaust air chamber structure (12) and in between these a partition wall (13) and therein a fan (14), with the aid of which air is made to flow (arrow $L_1$) from a supply chamber ($D_1$) into an exhaust chamber ($D_2$).

11 Claims, 14 Drawing Sheets

(56) References Cited

OTHER PUBLICATIONS

"Hydrocell Tuloilmapatteri", web page printout, http://www.hydrocell.fi/fi/lammonsiirtimet/tuloilmapatteri.html Aug. 2004.

"Retermia Kosteus—ja mikrobiongelmilta vältytään" web page printout, http://www.retermia.fi/fi/cfmldocs/index.cfm?ID=481 Feb. 2003.

"Hydrocell Referenssit", web page printout, http://www.hydrocell.fi/fi/lammonsiirtimet/referenssit.html.

"Heat recovery systems" web page printout, http://www.hydrocell.fi/en/heat_exchange_devices/heat_recovery_systems.html downlowded from website Feb. 6, 2008.

"Heat exchange devices" web page printout, http://www.hydrocell.fi/en/heat_exchange_devices/index.html downloaded from website Feb. 6, 2008.

Translation of Office Action dated Jan. 8, 2010 in related Norwegian application 20092221 which refers to two referance: D1 SE 531396 previously submitted as US20080196433 D2 FI 75663 previously submitted no translation provide.

* cited by examiner

AIR CONDITIONING DEVICE

CROSS REFERENCES TO RELATED APPLICATIONS

This application claims priority on Finnish App. No. 20085531, filed May 30, 2008, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention concerns an air conditioning device for making air flow from outside into a building or for making air flow out of a building.

Known in the state of the art are, for example, exhaust air units, which are placed on the roofs of hall spaces and other such and through which the exhaust air is moved through a bank of needle-fin tubes and further out of the building, whereby with the aid of a wall structure formed by the bank of tubes the exhaust air is filtered and heat is recovered from it into a heat carrier made to flow in the needle-fin tubes.

State-of-the-art solutions comprise a fan unit for making air flow into an interior space in an exhaust unit and further through a wall structure formed by needle-fin tubes and out of the building.

SUMMARY OF THE INVENTION

The present application has realized to form also the air conditioning device to be such that it can be used for conditioning as efficiently as possible the air arriving in the building or the air to be removed from the building. The invention realizes to form the air conditioning device as a modular device, which comprises a supply air chamber structure and an exhaust air chamber structure and in between these a partition wall and a fan, with the aid of which air provided by the fan is moved from an interior supply air chamber in the supply air chamber structure into the exhaust air chamber located on the other side of the partition wall and further through this into a ventilation duct of the building.

In the supply air device embodiment, the supply air chamber comprises a first filter and after this in the flow direction a second filter, of which the first filter is a pre-filter and the second filter is a fine filter. According to the invention, the first filter is formed of needle-fin tubes in such a way that they form a wall structure, through which the airflow is conducted to the fine filter and further through this by a suction provided by a fan located in a partition wall to the fan's pressure side, that is, into the exhaust air chamber inside the exhaust air structure's wall structure and further into the air duct of the building.

In the invention, the exhaust air chamber structure preferably comprises a bottom wall, side walls and a covering wall, which may be an opening and closing cover or which may comprise one. Correspondingly, the supply air chamber structure comprises a bottom wall, side walls and a covering wall, which may be an opening and closing cover or which may comprise one. Thus, there is access to the supply air device's supply air chamber $D_1$ by opening the cover structure, and the supply air chamber forms a man space, a so-called service space, where it is possible to perform cleaning of the filters and servicing of the plant. Correspondingly, it is possible to gain access inside the exhaust air chamber $D_2$ by opening the cover, and also the concerned exhaust air chamber forms a service space and man space, in which one may perform servicing of filters and fans.

The connecting direction in the supply air device embodiment can be chosen by turning the exhaust air chamber's modular U profile wall in the desired direction. In this manner it is possible to make air flow from the exhaust air chamber into the desired duct connection and in the desired direction. Thus, the exhaust air chamber can be connected in a desired direction to the supply air duct of the building in order to make air flow from outside first into the supply air chamber $D_1$, so that the air will flow through an air pre-filter in the supply air chamber $D_1$ to a fine filter and then further with the aid of a fan through a partition wall into an exhaust air chamber and further from the exhaust air chamber through a wall formed by a heat exchanger structure, such as a needle-fin tube, further into an exhaust space and from this into a duct, which is the supply air duct for ventilation of the building.

When the device is a supply air device, the air pre-filter in the supply air chamber $D_1$ is formed by a wall formed by needle-fin tubes and placed in a U profile, and then follows a fine filter, whose filtration rate is more efficient than the filtration rate of the pre-filter located first in the airflow direction $L_1$. Using the pre-filter it is possible either to heat or cool the air, and the pre-filter is formed by needle-fin tubes, wherein the needle fins are in a tape wound around a heat carrier tube, whereby in the tape there are two rows of needle fins, whereby the angle between opposite needle fins is an acute angle. Thus, the pre-filter can be used efficiently as a pre-filter and, in addition, with the aid of said filter it is possible efficiently to heat the air or, if cooling is desired, to cool it. In this way the air arrives from the pre-filter in a dry condition at the fine filter, and the fine filter's filtration result remains good at all times. There will be no dew point problems.

The device according to the invention is modular and it can be connected optionally to desired duct connections from different directions. The structure is not limited to a certain manner of installation and to certain directions of installation, but it can be adapted in a modular manner for desired duct systems and for connection from certain desired directions. The post-heating battery located on the exhaust side is preferably formed by the needle-fin tubes presented in this application by forming a wall structure of these, through which the air is made to flow.

The air conditioning device according to the invention may function either as a supply air device or as an exhaust air device. The supply air device embodiment was described above, whereby fresh air is brought from outside into the supply air chamber through the wall formed by needle-fin tubes, and preferably through the fine filter, and the air is moved further with the aid of the fan from the supply air chamber into the exhaust air chamber located on the other side of the wall and possibly through a post-heating battery formed by needle-fin tubes for further connection to the supply air duct of the building.

The air conditioning device according to the invention can also function as an exhaust air device. The structure is similar by and large. The device comprises a supply air chamber and an exhaust air chamber and in between these a partition wall and in this a fan. Using the fan, air is drawn from the building into the supply air chamber and further into the exhaust air chamber located on the other side of the wall and further through a wall preferably formed by needle-fin tubes and out of the building. Heat is carried from the exhaust air into a heat carrier made to flow in the needle-fin tubes of the needle-fin wall, whereby the energy efficiency of the building is increased. In this case, too, the wall formed by needle-fin tubes functions both as a heat carrying structure for recovering heat and also as a filter unit. Separate filtration is necessary in certain cases where also the exhaust air must be sufficiently clean.

In the following, the invention will be described by referring to some advantageous embodiments of the invention shown in the drawings of the appended figures, but there is no intention to restrict the invention to these embodiments only.

BRIEF DESCRIPTION OF THE DRAWINGS

FIG. 1A is an axonometric view.

FIG. 2A shows an axonometric view.

DESCRIPTION OF THE PREFERRED EMBODIMENTS

Figure 1A:
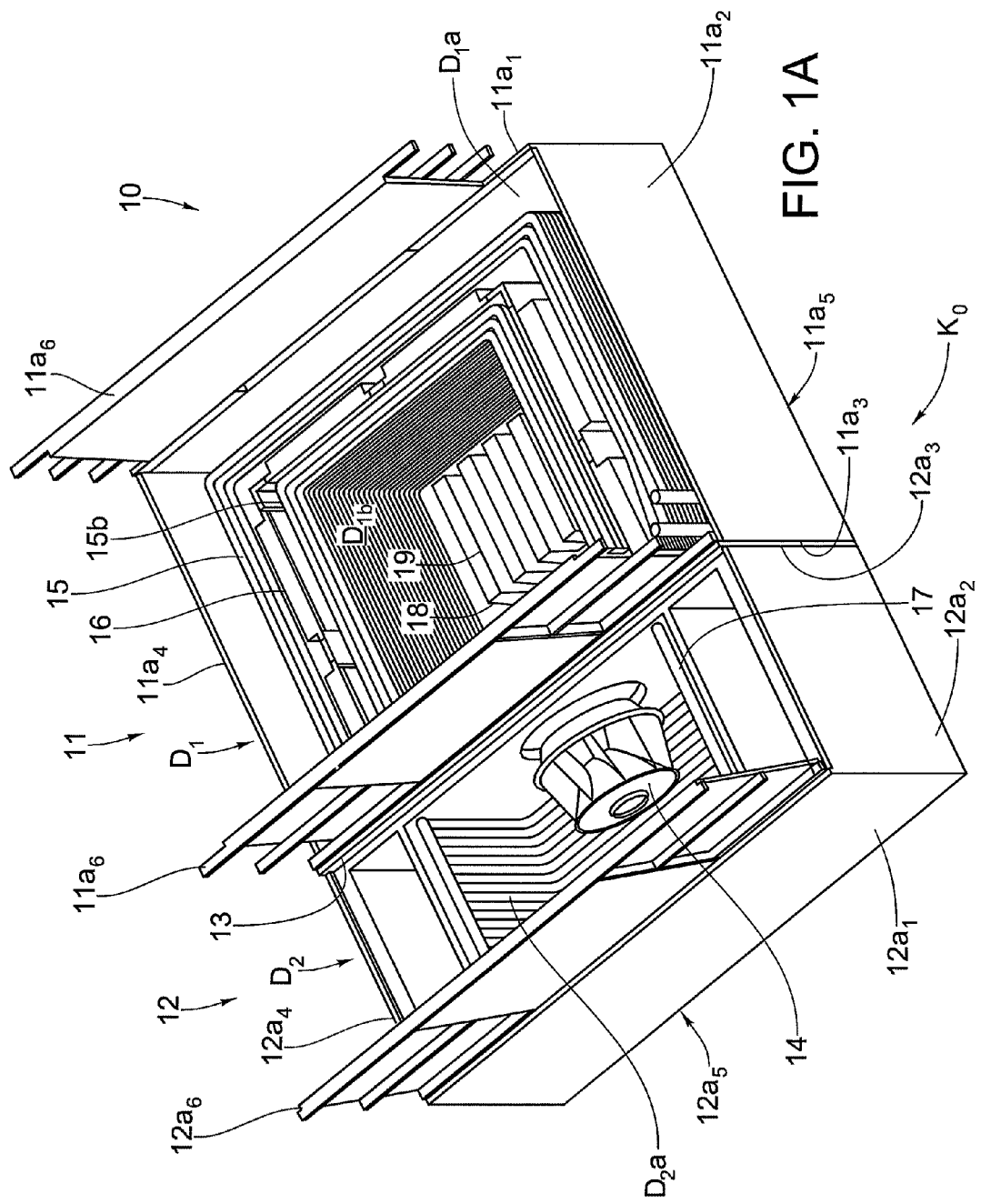
FIG. 1A shows the air conditioning device according to the invention, through which air is brought from outside into the building.
Figure 1B:
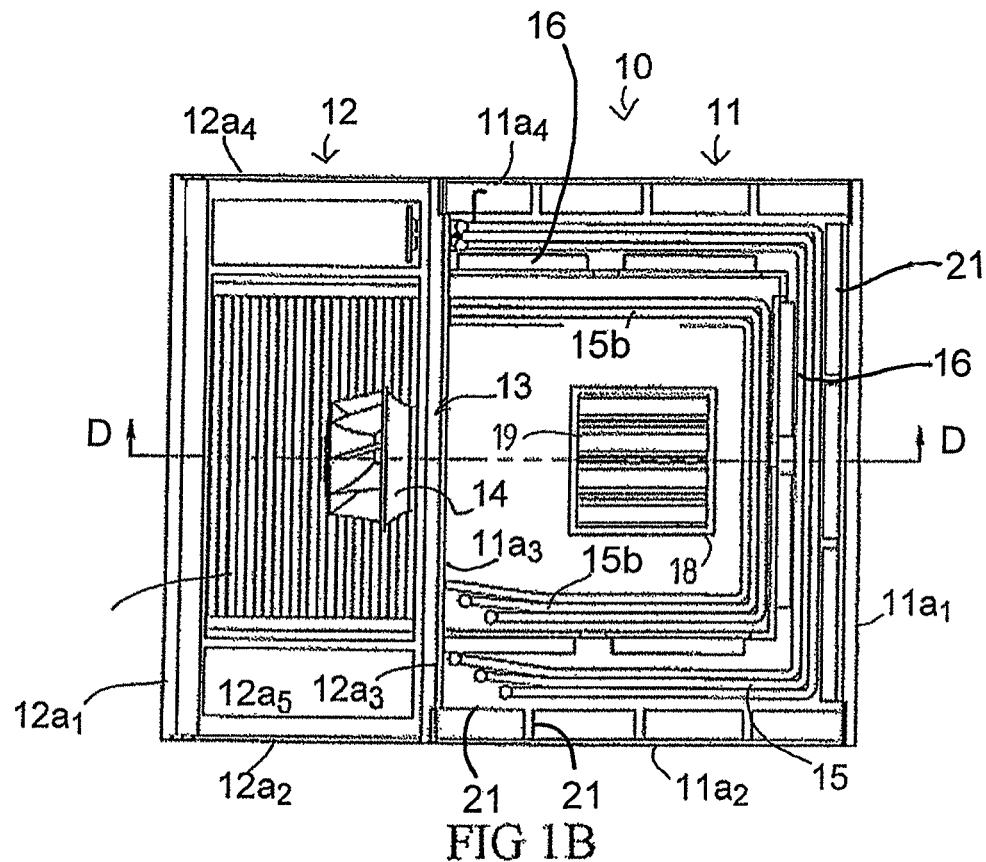
FIG. 1B is a view from above of the device solution of FIG. 1A as a mechanical drawing.
Figure 1C:
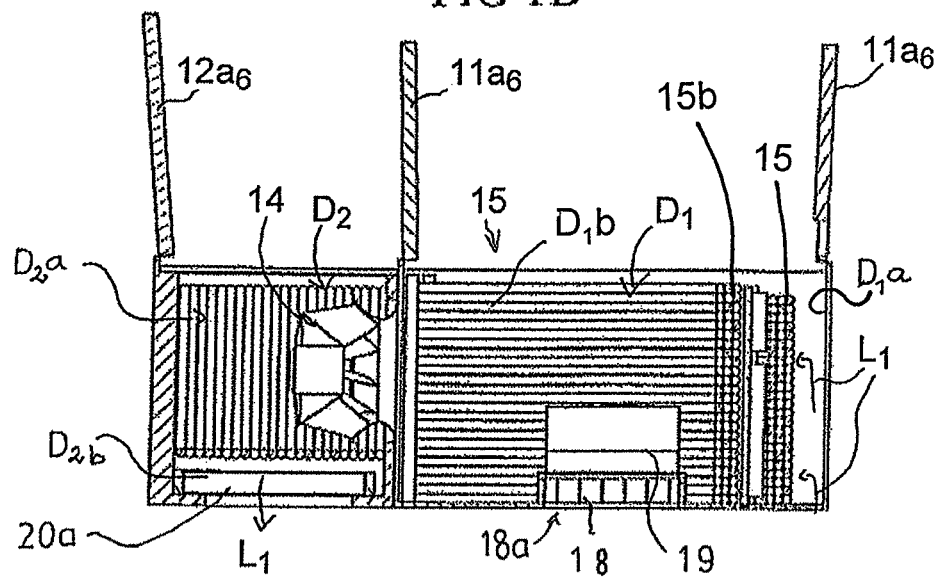
FIG. 1C shows a cross-sectional view along line D-D of FIG. 1B.
Figure 1D:
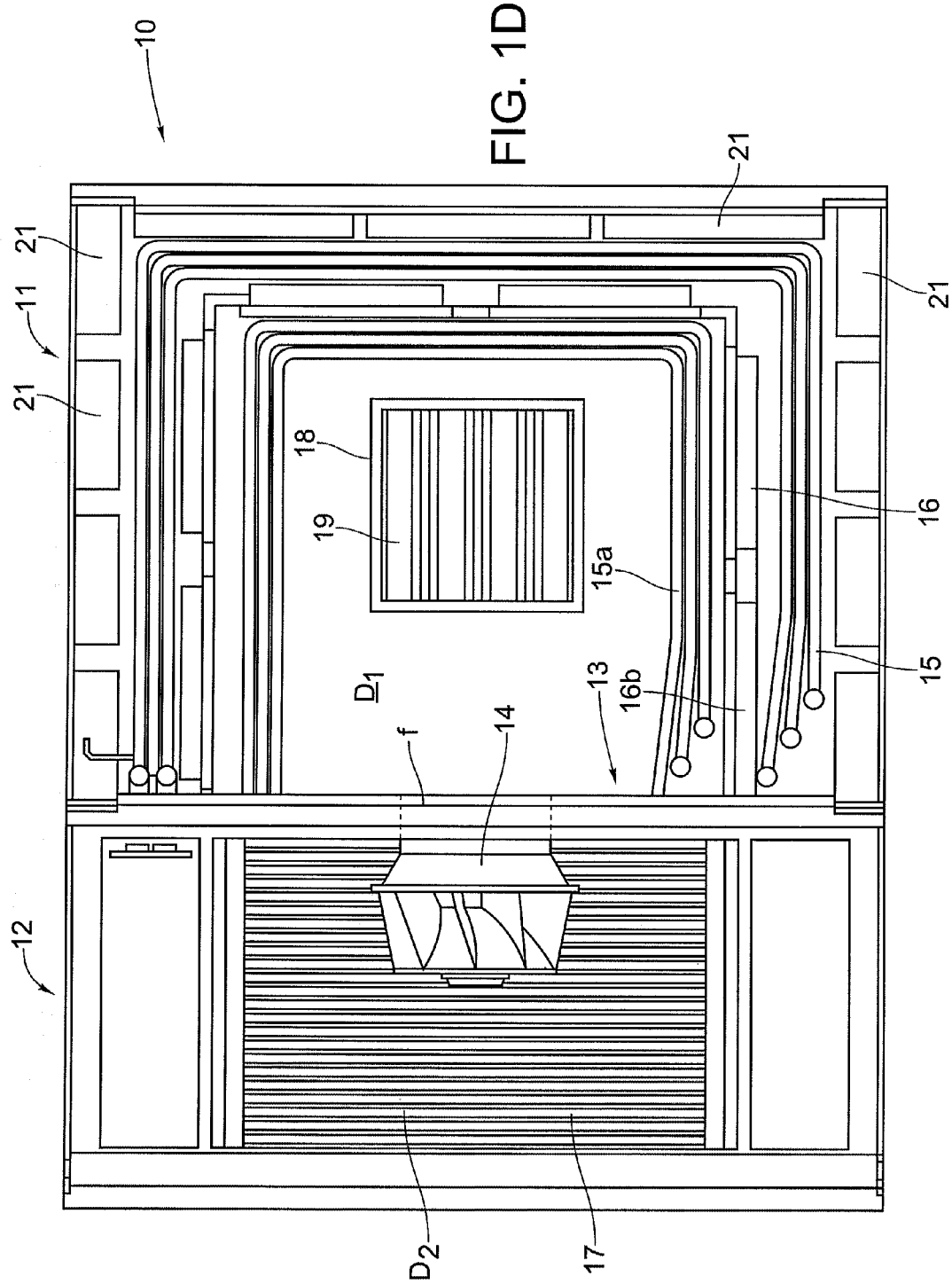
FIG. 1D shows a view from above of the plant on a larger scale than in the mechanical drawing of FIG. 1B.

FIGS. 1A-1E show the air conditioning device 10 according to the invention, which is a supply air terminal device. The supply air terminal device 10 comprises a modular structure. The supply air terminal device 10 comprises a supply air chamber structure 11, which comprises walls $11a_1$, $11a_2$, $11a_3$, $11a_4$, $11a_5$ and a wall $11a_6$ forming an opening and closing cover. Inside the supply air chamber structure 11 a supply air chamber $D_1$ is formed in a space limited by said walls, and the supply air chamber is also limited by a partition wall 13, which comprises a fan 14 in an opening fin the wall for providing an airflow into the supply air chamber $D_1$ and from this further into an exhaust air chamber structure 12 located on the other side of partition wall 13, preferably into its internal exhaust air chamber $D_2$. The fan 14 is located in the exhaust air chamber $D_2$. The exhaust air chamber structure 12 comprises walls $12a_1$, $12a_2$, $12a_3$, $12a_4$, $12a_5$ and an opening and closing covering wall $12a_6$, that is, a cover, hatch or other such. The air is supplied into the supply air chamber $D_1$ through flow gaps, which can be formed as gaps between the wall structures, or openings 21 are formed in the walls. Air can hereby be made to flow inside the structure 11 into the supply air chamber $D_1$, either under and/or above, or also through a possible perforation, which is formed in the walls.

In an internal space in the supply air chamber structure 11 a supply chamber $D_1$ is formed for the airflow $L_1$, which is made to flow from the space $D_1a$ through the wall 15 formed by needle-fin tubes and then further through a wall structure formed by a fine filter 16 and located in the flow direction $L_1$ into the supply air chamber's space $D_1b$, from which the air is moved on through the fan 14 into the exhaust air chamber $D_2$ of the exhaust air chamber structure 12 located on the other side of the partition wall 13. From the supply side $D_2a$ of the exhaust air chamber $D_2$ the air is made to flow through the post-heating battery 17 to the exhaust side $D_2b$, from which the exhaust air chamber structure 12 is further connected to an air duct, through which the air is made to flow into the building or other such. The exhaust air chamber structure 12 is preferably such that the exhaust air connection to it can be chosen from a desired direction, whereby the modular supply air device 10 can easily be connected in the desired duct direction.

In the supply air chamber's $D_1$ bottom $11a_5$ there is a filter 19 for the building's circulating air in an opening 18. The opening 18 comprises a damper 18a for the airflow. The air from outside ($L_1$) arriving in chamber $D_1$ from openings 21 can be regulated by dampers 20 located in connection with the openings 21.

The partition wall 13 may be formed by two walls $11a_3$, $12a_3$ comprising an opening f for a fan 14.

The air conditioning device 10 is a modular structure, in which the device's exhaust air chamber section $D_2$ can thus be connected optionally to ventilation duct systems leading to the building from different directions.

The air conditioning device's 10 module for connection to a building preferably comprises a post-heating battery 17, whose wall structure E is a U profile and which can be turned in desired directions depending on the direction from which the exhaust air chamber structure is connected to the ventilation duct system of the building.

Figure 1E:
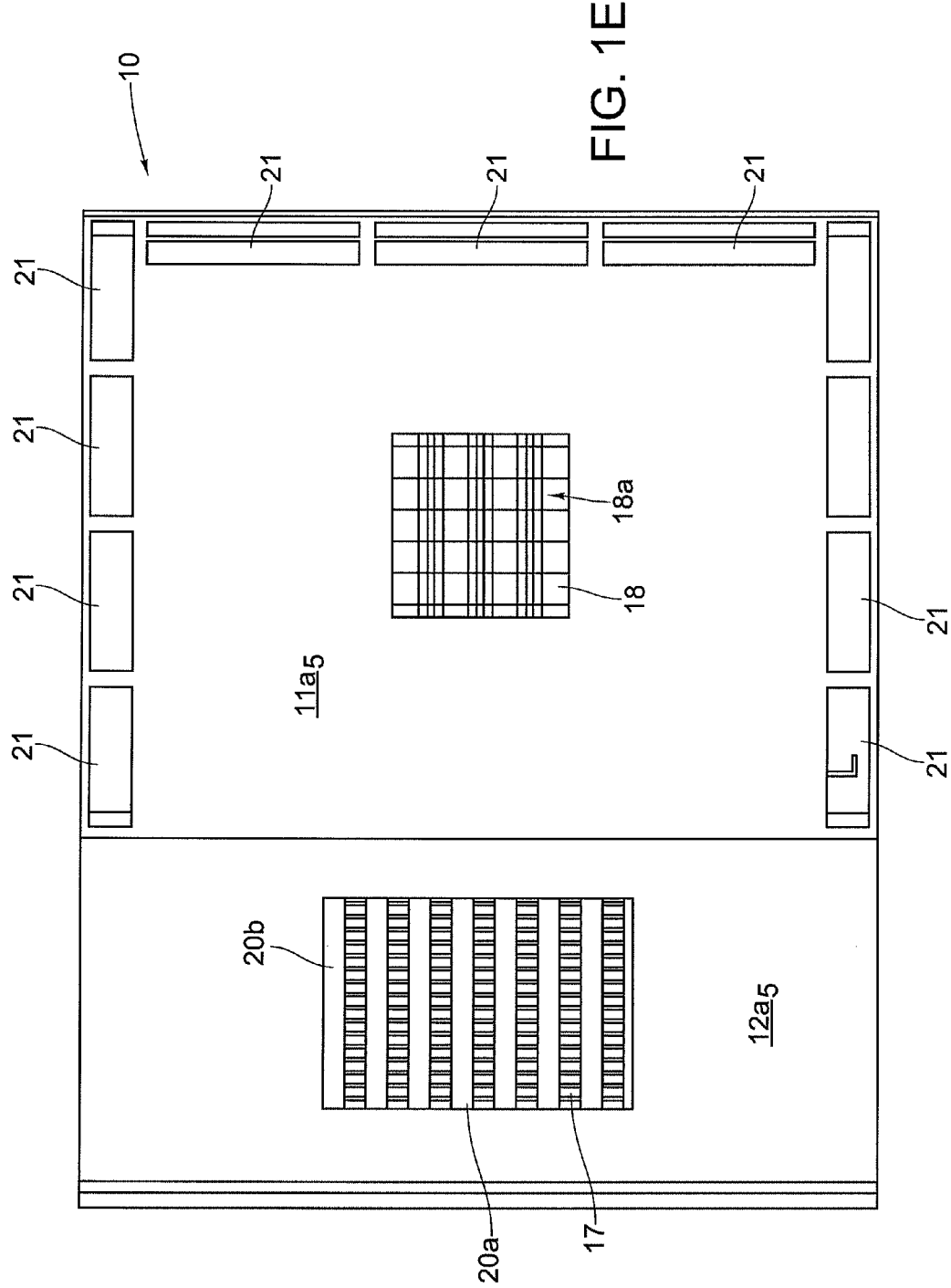
FIG. 1E is a view from below in the direction of arrow $K_0$ in FIG. 1A.

As shown in FIG. 1E, the exhaust chamber $D_2$ comprises a valve 20b in an exhaust opening 20a in the bottom $12a_5$.

FIGS. 2A-2E show a supply air device embodiment of the air conditioning device 10 according to the invention, with which air ($L_1$) is supplied from outside into the building. The embodiment 2A is an axonometric presentation of a supply air chamber structure 11, a partition wall 13 and an exhaust air chamber structure 12, from which the air is moved further as shown in the figure to a distribution chamber $D_2'$. The supply air chamber $D_1$ and the exhaust air chamber $D_2$ thus comprise in between them a partition wall 13, whereby on the side of the exhaust air chamber $D_2$ in the partition wall 13 there is a fan 14, which provides an airflow from the supply air chamber $D_1$ to the exhaust air chamber $D_2$. The supply chamber $D_1$ and the exhaust chamber $D_2$ are interconnected for flow purposes through the wall's 13 opening f, in which is mounted a fan 14. As in the previous embodiment, the supply air chamber structure 11 comprises filter/heat carrier walls 15 formed by needle-fin tubes 100 and shaped in a U profile as seen from above. Inside the walls 15 there remains internally in chamber $D_1$ a man space for service work, to which access is gained by opening the opening/closing cover $11a_6$, hatch or other such, which covers the chamber. On the output side of the filter/heat carrier 15 in relation to the airflow direction $L_1$, that is, after the filter/heat carrier structure 15, there is a fine filter 16. After the fine filter 16 in chamber $D_1$ there is a post-heating battery 15b. The thermal energy for the heat carrier 15 and 15b is preferably taken from the energy of the building's exhaust air or from some other source of free energy. A fine filter 16 will not be needed in all cases, but such an embodiment is advantageous, where the air supplied into the building is further conditioned in a fine filter 16. In accordance with the invention, the air is thus made to flow from the supply chamber $D_1$ to the exhaust chamber $D_2$ with the aid of fan 14, which is located in the partition wall 13 separating the chambers $D_1$ and $D_2$. From chamber $D_2$ the air is moved further preferably through a post-heating battery 17 and out of the chamber and further to the building's system of supply air ducts. The post-heating battery 17 is preferably a filter/heat carrier wall structure formed by needle-fin tubes 100. As shown in the figure, in the chamber's $D_1$ bottom there is an opening 18, to which the circulated airflow conducted from the building can be supplied through a separate duct. A valve 18a is located in the opening 18 and it can be used for controlling the circulated airflow from the building into space $D_1$. As shown in the figure, in connection with opening 18 there is a fine filter 19 resting under the force of gravity. Thus, in the device solution according to the figure, it is possible to conduct through the filter 19 room air or hall air into the supply air chamber $D_1$ as circulated air. Air is also conducted from outside to chamber $D_1$ through the wall structure E formed by needle-fin tubes 100 as shown by the arrow $L_1$, and through a second supply air chamber $D_1'$ shown in the figure. The second chamber $D_1'$ comprises a wave-like wall structure E formed by needle-fin tubes and after this a set of valves 22 in between the first supply air chamber $D_1'$ and the second supply air chamber $D_1$. The distribution chamber $D_2'$ is located in the end of exhaust air chamber $D_2$ and from this there is a connection to the supply air duct system of the building or other such.

Figure 2A:
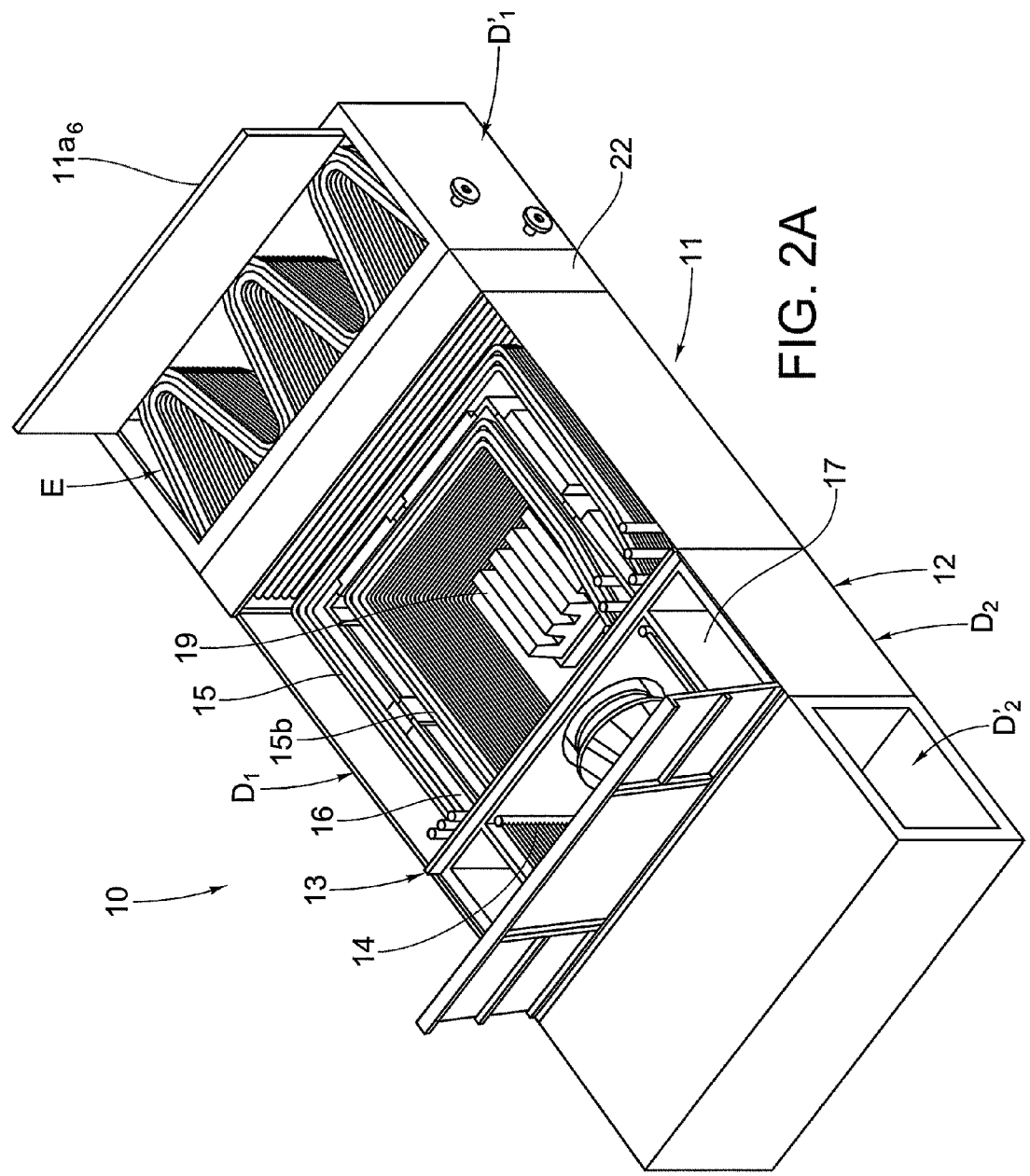
FIG. 2A shows a supply air device embodiment of the air conditioning device, which for conditioning of air comprises a wave-like wall structure formed by needle-fin heat exchangers in a first supply air chamber before the supply air chamber proper, which comprises heat exchangers formed by needle-fin tubes and, in the embodiment shown in the figure also a filter for a circulated airflow in the middle of the structure. In the wall between the supply air and exhaust air chambers there is a fan, which brings about circulation of the air from the supply air chamber into the exhaust air chamber and further into a distribution chamber and from this into the building.
Figure 2B:
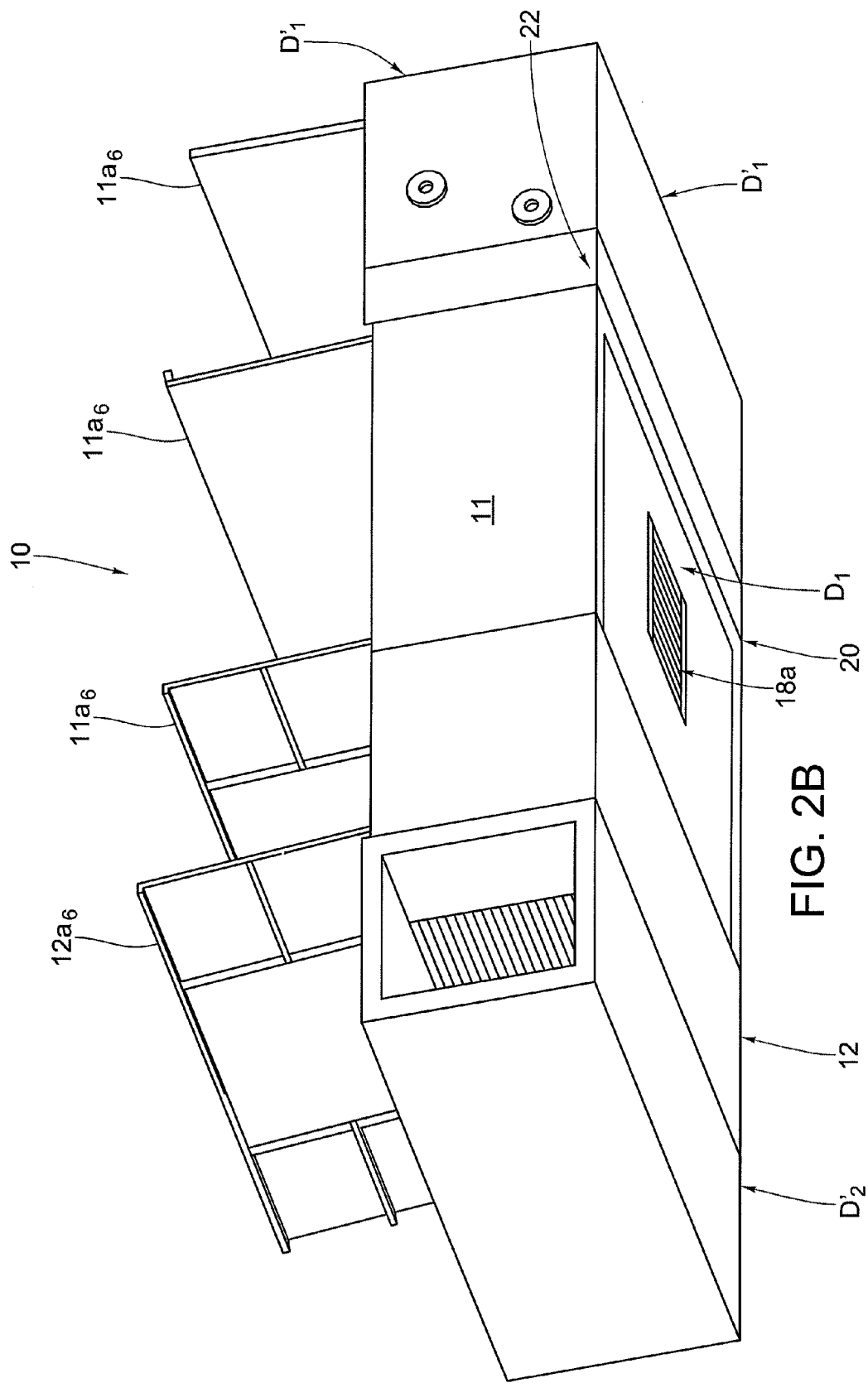
FIG. 2B shows chamber structures and joining opening and closing covers, whereby there is an easy access inside the chambers for service work.
Figure 2C:
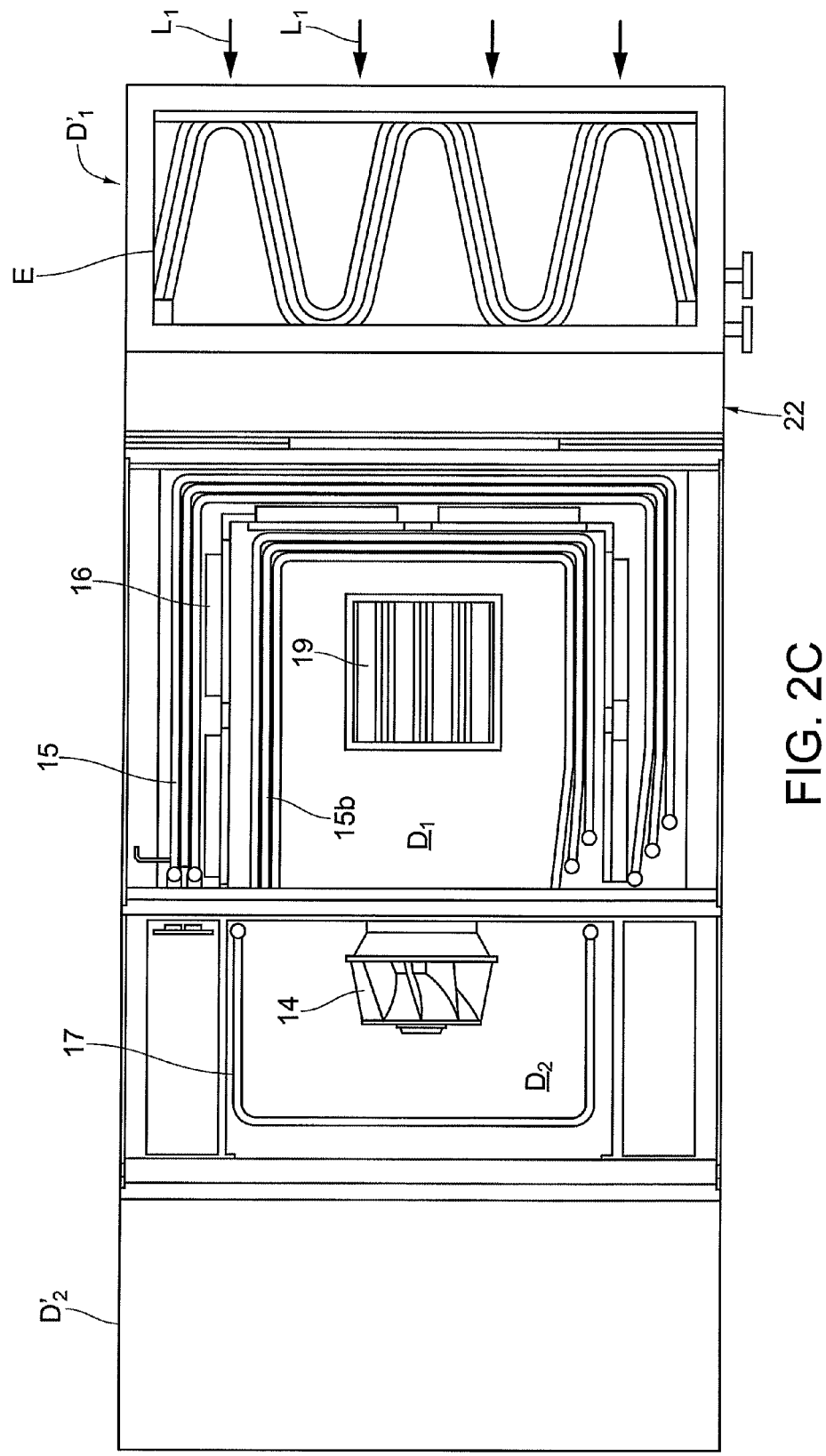
FIG. 2C is a view from above of the structure shown in FIG. 2A, like FIG. 2D as a mechanical drawing.
Figure 2D:
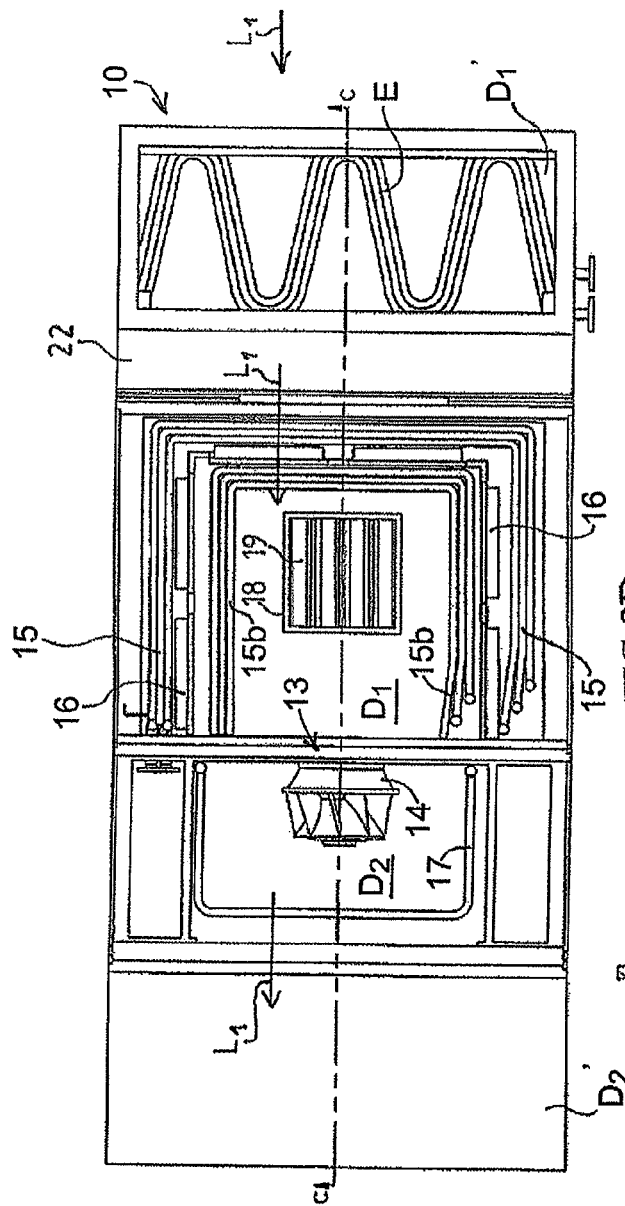
FIG. 2E is a cross-sectional view along line C-C of FIG. 2D.
Figure 2E:
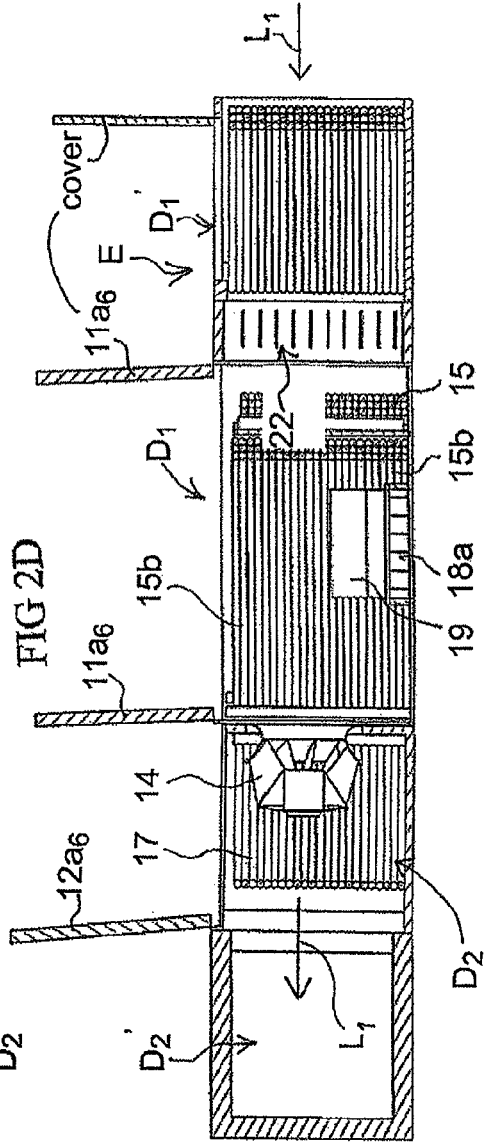

FIG. 2A is an axonometric view of the structure. FIG. 2B is an axonometric view of the structure and it shows opening and closing covers $11a_6$ or other such, which are opened to gain access for service work to the chamber spaces $D_1$, $D_2$, $D_1'$. FIG. 2C is a view from above of the structure. As shown in FIG. 2C, the exhaust air chamber $D_2$ comprises a post-heating battery, that is, a wall structure E formed by needle-fin tubes 100 as a U profile. In FIG. 2D the structure is shown as a mechanical drawing, and FIG. 2E is a cross-sectional view along line C-C of FIG. 2D.

In the application, the general reference letter E indicates walls, which are formed by superimposed needle-fin tubes 100.

Figure 3A:
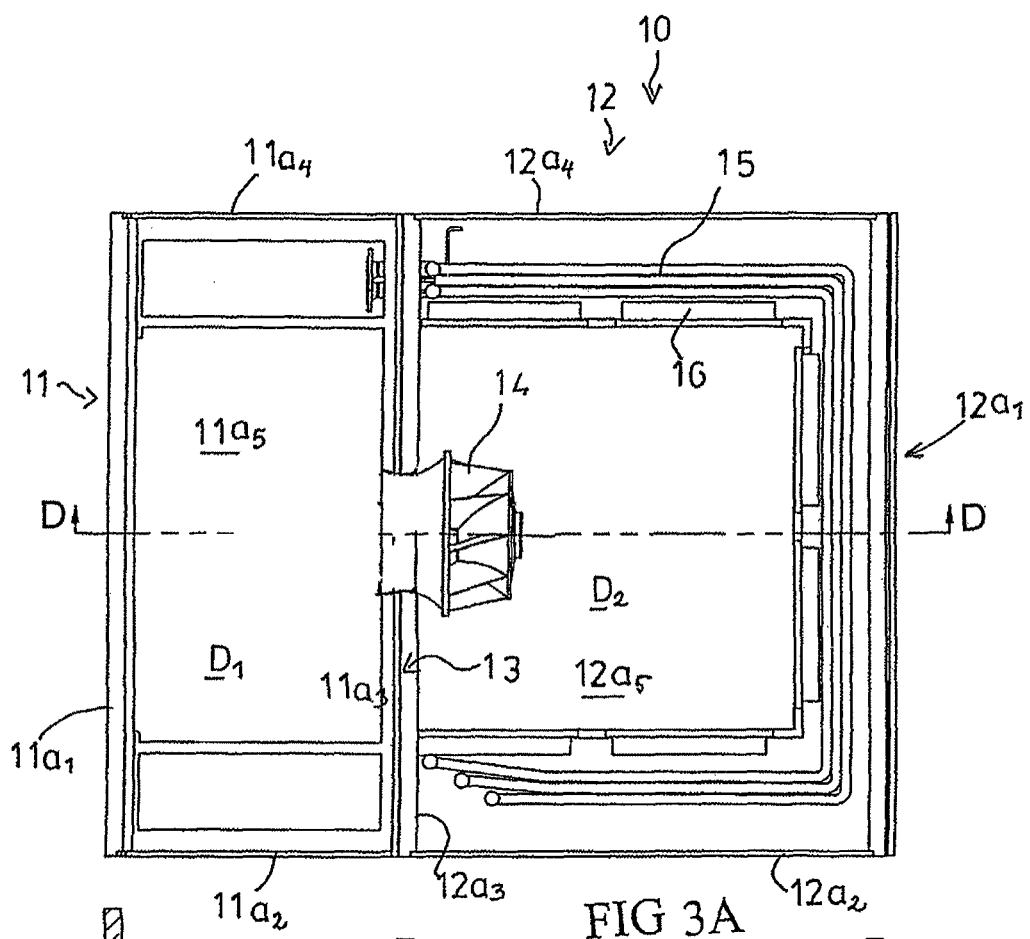
FIG. 3A shows an exhaust air device embodiment of the air conditioning device, through which air is removed from the building and further through a heat exchanger, which is formed by a needle-fin tube structure; by a wall structure formed by needle-fin tubes, whereby heat is carried from the air into the internal heat carrier of the needle-fin tubes in order to recover heat from the exhaust air.
Figure 3B:
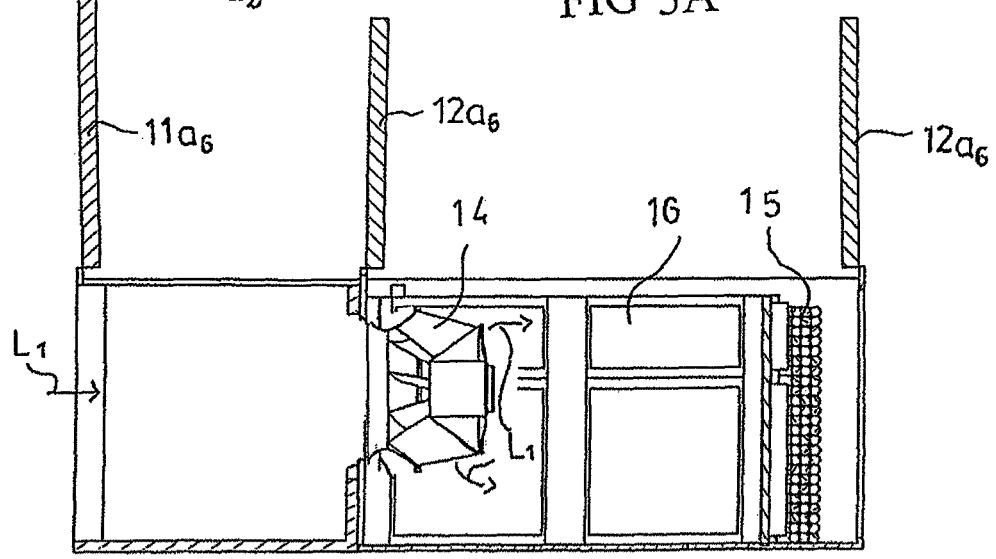
FIG. 3B is a cross-sectional view along line D-D of FIG. 3A.
Figure 3C:
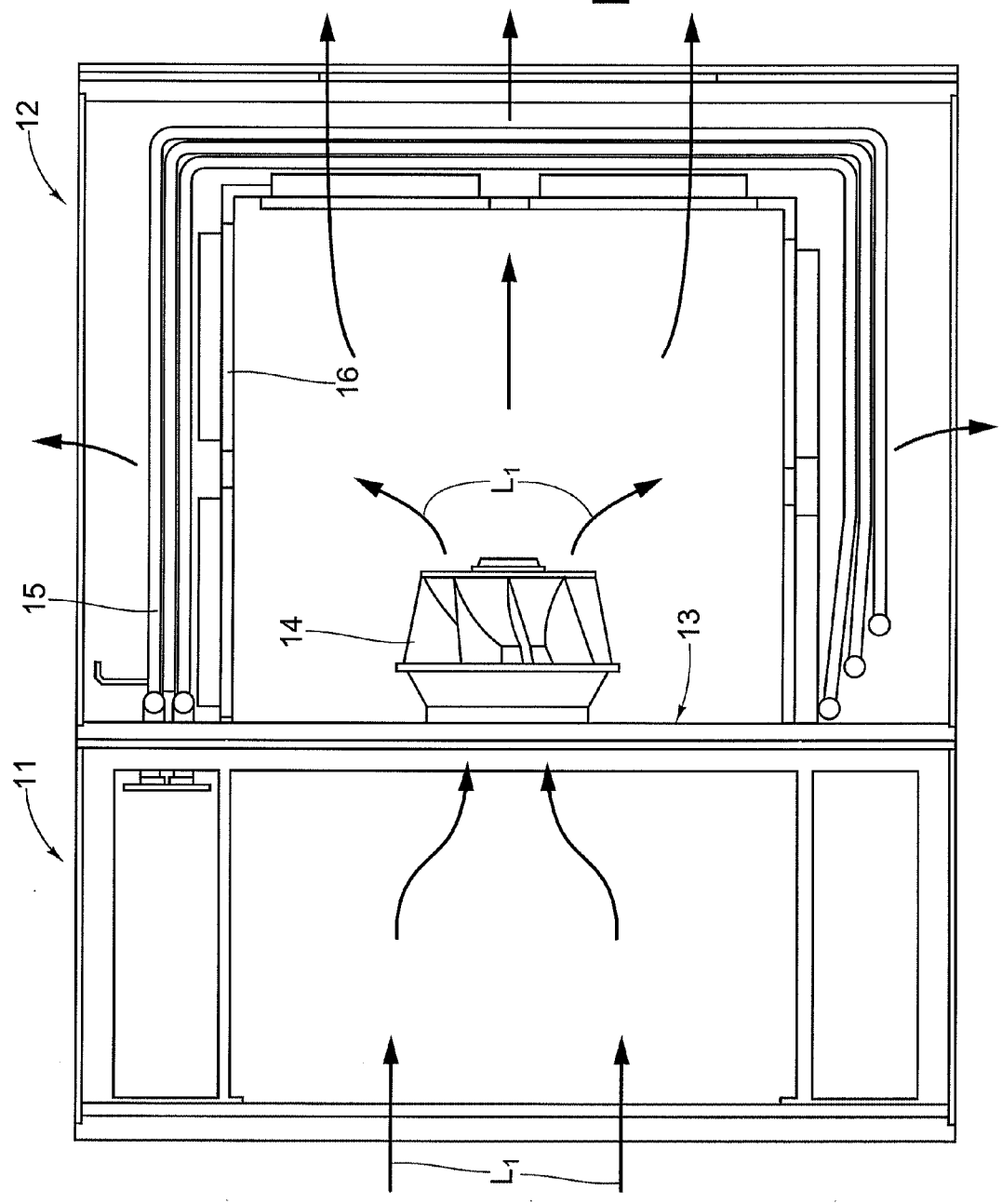
FIG. 3C shows a view from above of the device with the covers opened.

FIGS. 3A-3E show an air conditioning device 10 according to the invention, which is an exhaust air device, through which and with the aid of which air is removed from a building or other such. As shown in the embodiment in FIGS. 3A and 3B, the device 10, such as a supply air device embodiment, comprises a supply air chamber $D_1$ and an exhaust air chamber $D_2$ and in between them a partition wall 13 and therein in its opening f a fan 14 for making the air flow into the supply air chamber $D_1$ and through it into the exhaust air chamber $D_2$ and further through a heat exchanger 15 out of the building. The partition wall 13 may be formed by two walls $11a_3$, $12a_3$, which comprise an opening f for a fan 14, such as in the embodiments shown in FIGS. 1A-2E. As shown in FIGS. 3A and 3B, the heat exchanger 15 is formed by a wall structure E formed by needle-fin tubes 100, where the needle-fin tubes 100 are placed on top of one another in a U profile. Thus, as seen from above, a U profile is formed. As shown in the figure, there is also a separate pre-filter 16 and only after this there is the heat exchanging structure 15. The supply air chamber structure 11 is formed by walls $11a_1$, $11a_2$, $11a_3$, $11a_4$, $11a_5$, $11a_6$ and, correspondingly, the exhaust air chamber structure 12 is formed by walls $12a_1$, $12a_2$, $12a_3$, $12a_4$, $12a_5$, $12a_6$. The structure is modular, as is the supply air embodiment. The supply air chamber structure or module can be installed in desired directions in relation to the exhaust air duct of the building. Thus, the air to be drawn out of the building is conducted first to the air conditioning device's supply air chamber $D_1$ with the aid of fan 14, from which it is moved to the exhaust air chamber $D_2$ and further through the heat exchanger 15 out of the building. The fan 14 is in the exhaust air chamber $D_2$. According to the invention, both the supply air device structure 11 and the exhaust air device structure 12 are very identical to one another, and thus it is possible in a modular manner to utilise parts of the structures in manufacture and sales.

The air conditioning device 10 according to the invention thus comprises modular supply air chamber and exhaust air chamber structures 11, 12, whereby the air conditioning device 10 can be connected from different directions to the exhaust air duct system of the building.

Figure 3D:
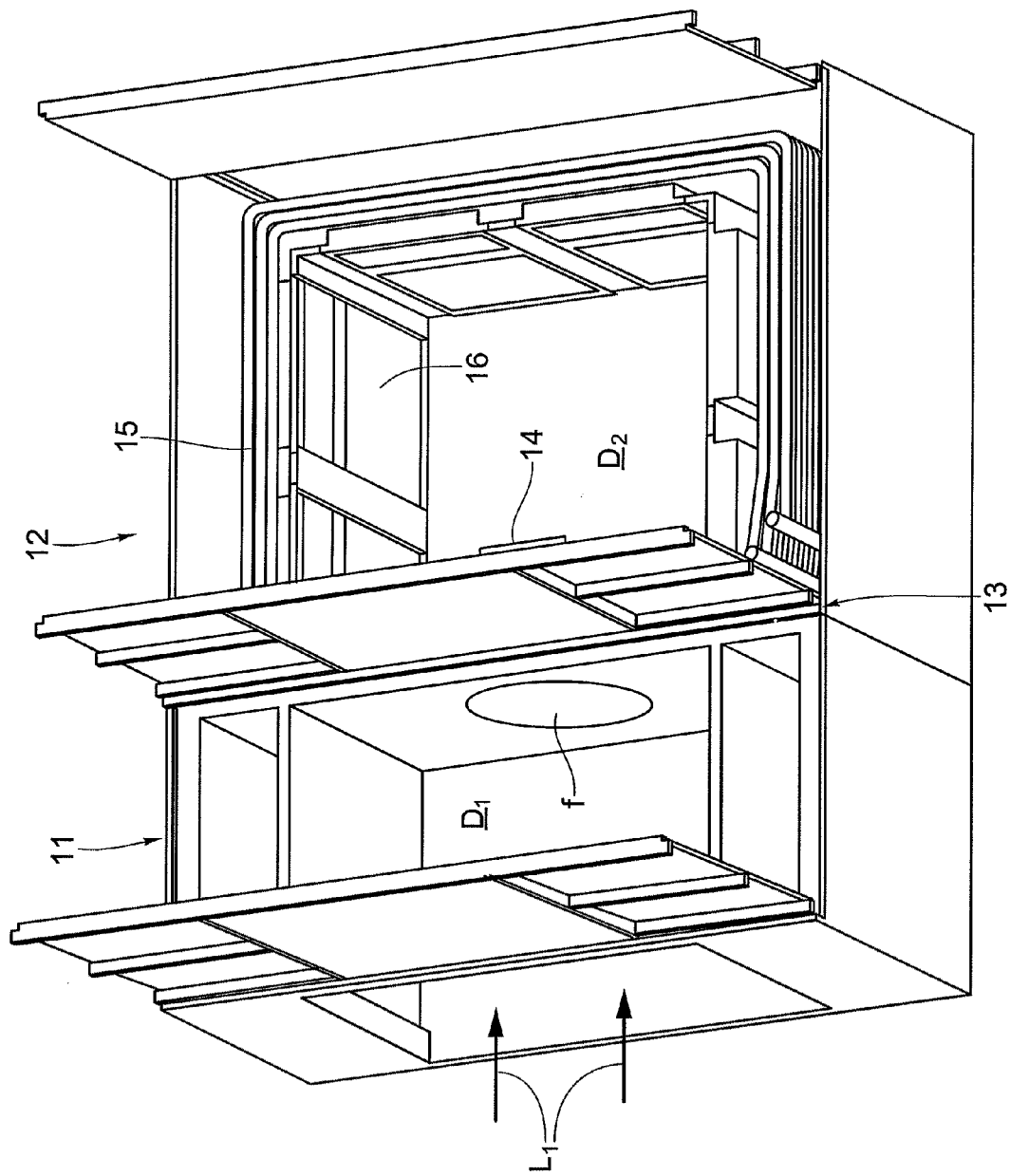
FIG. 3D shows an axonometric view of the device solution shown in FIG. 3A.

The exhaust air device 10 shown in FIG. 3D in connection with an exhaust air chamber $D_2$ and a supply air chamber $D_1$ comprises opening and closing hatches $11a_6$ and $12a_6$, as does the supply air device embodiment. The structure is thus identical and access is thus easily gained into the internal space of the filters through said opening/closing hatch for service work purposes.

Figure 4A:
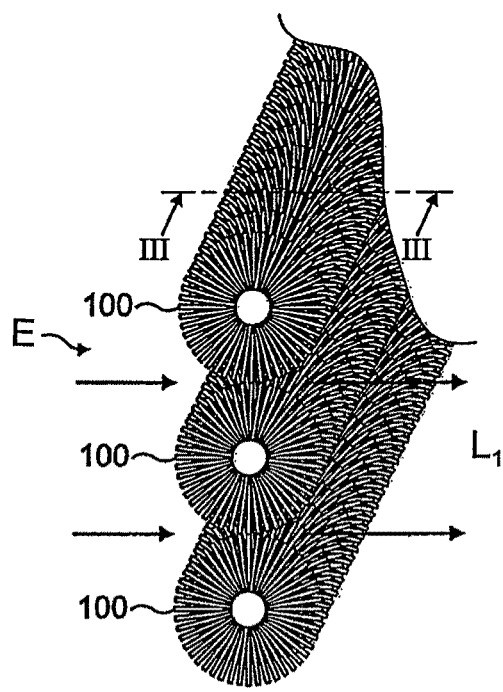
FIGS. 4A-4D show a needle-fin tube structure of the kind used as a filter structure and as a heat carrier structure.
Figure 4B:
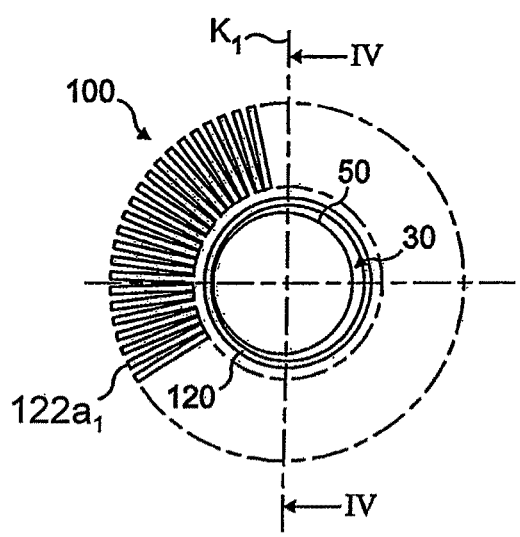
Figure 4C:
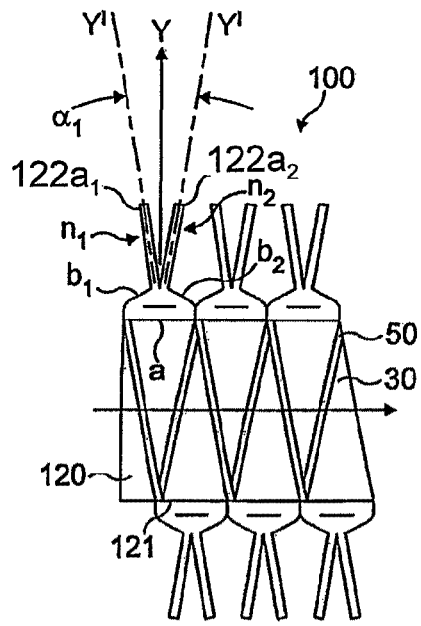
Figure 4D:
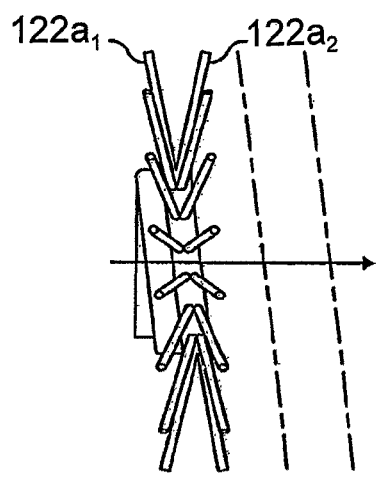

FIG. 4A shows a needle-fin tube 100 according to the invention. FIG. 4B is a cross-sectional view along line III-III of FIG. 4A, and FIG. 4C is a cross-sectional view of a fin tape along line IV-IV of FIG. 4B. FIG. 4D shows the structure in the direction of arrow $K_1$ in FIG. 4B. As shown in FIGS. 4A, 4B, 4C and 4D, the needle-fin heat exchanger 12 comprises a central tube 100, to which the fin tape 121 is joined by winding and gluing it around the needle-fin tube 100.

As shown in FIG. 4C, in the needle-fin tape 121 there are two adjacent needle rows $n_1$ and $n_2$, whose opposite needle fins $122a_1$, $122a_2$ are at an acute angle $\alpha_1$ in relation to one another. The tape 121 has a base part a and bent above this there are walls $b_1$ and $b_2$, to one of which a needle row $n_1$ is joined, while to the other a needle row $n_2$ is joined. The fin's $122a_1$, $122a_2$ . . . cross-section is a rectangle or a square, whereby the fin is of a small width h in order to deflect the air. Said angle $\alpha_1$ is an acute angle, whereby impurity particles will remain at different height positions stuck in between adjacent fins $122a_1$, $122a_2$, and the fin tube wall E thereby functions as a coarse-mesh filter/pre-filter. The needle-fin tube 120 functions both as a filter and also as a heat exchanger. Through it heat can be transferred from the heat carrier made to flow inside the needle-fin tube through the needle fins $122a_1$, $122a_2$ . . . into the air, or heat can be transferred in the opposite direction from the air from flow $L_1$ through the needle fins $122a_1$, $122a_2$ ... to the tube's 120 central heat carrier made to flow therein, whereby the airflow $L_1$ is cooled. Both purposes of use are possible.

Figure 4E:
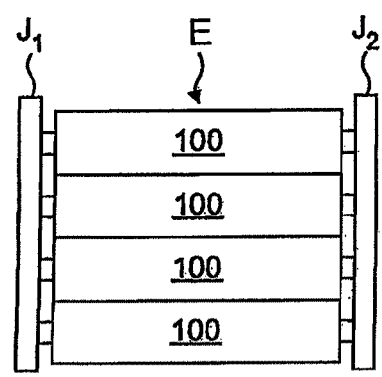
FIG. 4E is an elevational view of a wall structure E formed by needle-fin tubes of this invention.

Thus, the needle-fin tubes 100 can be used in the manner shown in FIG. 4E. The needle-fin tubes 100 are formed as a filter wall E, whereby the heat carrier is conducted from the distribution manifold $J_1$ into the wall's E each needle-fin tube 100, and the heat carrier is removed from the distribution manifold $J_2$. The wall E forms a pre-filter, a so-called coarse-mesh filter and a heat exchanger, after which the plant comprises a fine filter, with which it is possible from the air after pre-filtration to remove impurity particles of a smaller particle size. The needle-fin tube 100 has a linear conductance over the whole flow rate area of the air $L_1$.

Figure 5:
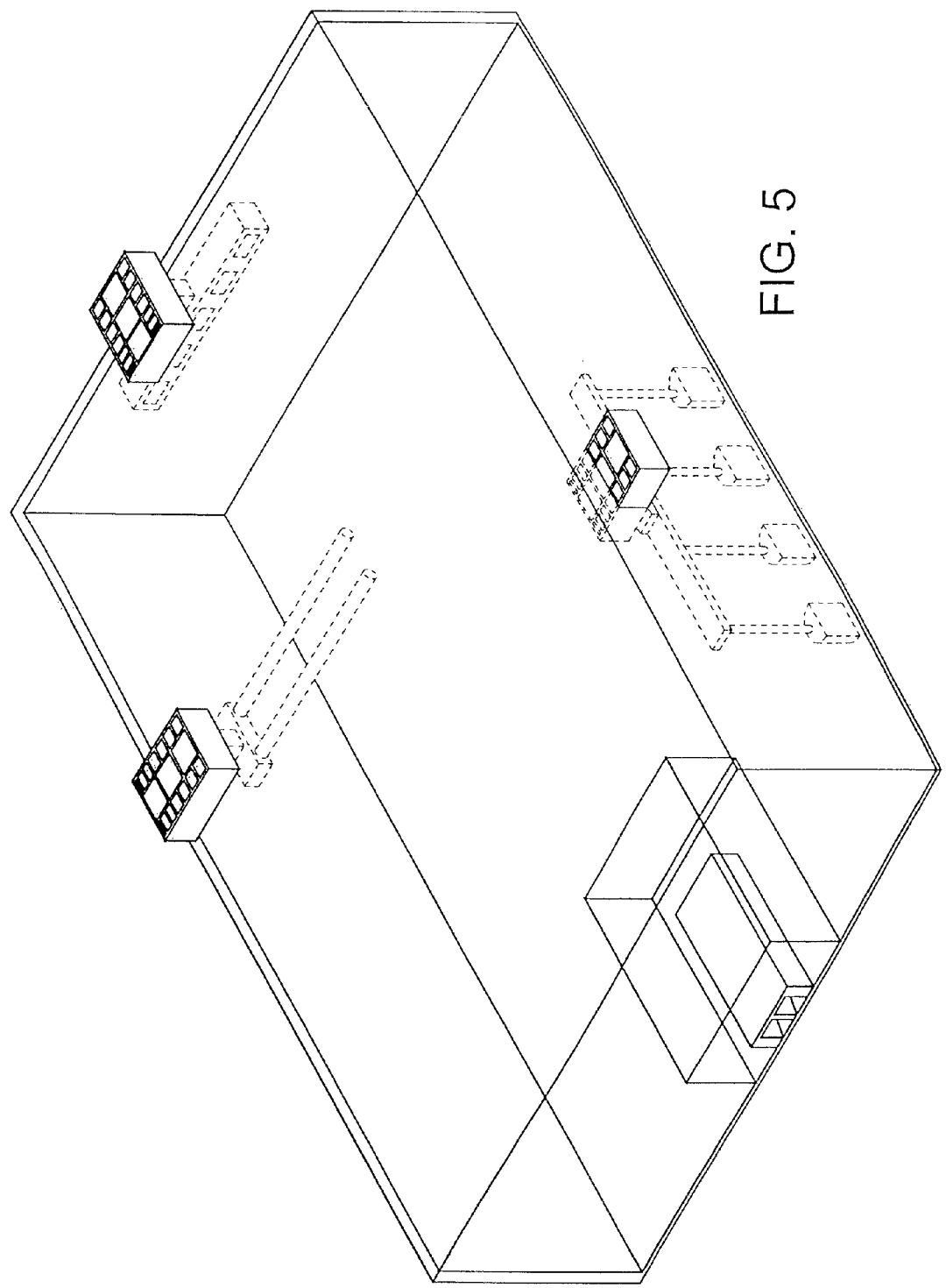
FIG. 5 shows how devices are located in different positions in the building.

FIG. 5 shows locations in the building of the air conditioning device according to the invention, either a supply air device or an exhaust air device. According to the invention, the supply air device can be located in such a way in the building that the supply air device's supply chamber structure is located out of doors and the supply air device's exhaust chamber structure is located on the other side of the wall of the building inside the building.

The invention claimed is:

1. An air conditioning device for conducting air from outside into a building or for conducting air from inside a building outside of the building, comprising:
   at least one supply air chamber structure located external to a building, the supply air chamber structure having first wall structures forming a supply air chamber;
   wherein the supply air chamber first wall structures have through flow gaps which are formed as gaps between the first wall structures, or openings that are formed in the first wall structures, such that air can be made to flow into the supply air chamber from under or above the first wall structures or through the openings formed in the first wall structures from a plurality of directions;
   at least one exhaust air chamber structure forming an exhaust air chamber separated from the at least one supply air chamber structure by a partition wall therebetween;
   a fan mounted to supply air to an opening defined by the partition wall, for causing air to flow between the supply air chamber and the exhaust air chamber;
   at least one second wall structure, mounted between the fan and the at least one supply air chamber structure, the at least one second wall structure formed by a plurality of stacked needle-fin tubes, forming a filter wall through which air is made to flow from the plurality of directions, and the at least one second wall structure forming a heat exchanger through which air is made to flow by the fan;
   a heat carrier in the tube of each needle-fin tube, so that thermal energy is transferred from the heat carrier in the needle-fin tube through needle fins into the air, or in the opposite direction from the air into the heat carrier;
   wherein the filter wall needle-fin tubes are positioned one on top of the other; and
   wherein an air post-heating battery is formed by a second plurality of stacked superimposed needle-fin tubes one on top of the other and mounted in the exhaust air chamber between the fan and the at least one exhaust air chamber structure.

2. The air conditioning device of claim 1 wherein each needle-fin tube is a tube wrapped with a needle-fin tape having two adjacent and opposite needle rows of needle fins at an acute angle in relation to one another.

3. The air conditioning device of claim 1, further comprising a fine filter whose filtration rate is more efficient than the filtration rate of the filter wall, the fine filter positioned so as to filter air from a plurality of directions between the fan and the at least one second wall structure formed by a plurality of stacked needle-fin tubes.

4. The air conditioning device of claim 1 wherein the exhaust air chamber structure is connected to a ventilation duct system leading to the building.

5. The air conditioning device of claim 4 wherein the exhaust air chamber structure connected to a ventilation duct system leading to the building comprises a post-heating battery formed by a plurality of stacked needle-fin tubes mounted in the exhaust air chamber, whose wall structure is a U profile turned in a selected direction from which direction the exhaust air chamber structure is connected to the ventilation duct system leading to the building.

6. The air conditioning device of claim 1 wherein a man space is defined between the fan mounted in the partition wall and the at least one second wall structure, and
   wherein the supply air chamber structure comprises a cover, forming a hatch which can be opened and closed so that a serviceman can enter the man space for service work.

7. The air conditioning device of claim 1 wherein the exhaust air chamber structure comprises walls, a floor and a cover forming a hatch which can be opened and closed so that a serviceman can enter a service space defined by the exhaust chamber.

8. The air conditioning device of claim 1 wherein the entire exhaust air chamber structure is located inside the building and the partition wall is located at or close to a wall between the outside of the building and the inside of the building.

9. The air conditioning device of claim 1 further comprising a second supply air chamber, separated from the supply air chamber by a damper, the first supply air chamber positioned between the damper and the partition wall; and
   wherein the second supply air chamber comprises a heat carrier wall structure which is formed by needle-fin tubes which are positioned on top of one another to form a wall shaped as a wave as seen from above.

10. An air conditioning device for conducting air from outside into a building or for conducting air from inside a building outside of the building, comprising:
   at least one supply air chamber structure located external to a building, the supply air chamber structure having first wall structures forming a supply air chamber;
   wherein the supply air chamber first wall structures have through flow gaps which are formed as gaps between the first wall structures, or openings that are formed in the first wall structures, such that air can be made to flow into the supply air chamber from under or above the first wall structures or through the openings formed in the first wall structures from a plurality of directions;
   at least one exhaust air chamber structure forming an exhaust air chamber separated from the at least one supply air chamber structure by a partition wall therebetween;
   a fan mounted to supply air to an opening defined by the partition wall, for causing air to flow between the supply air chamber and the exhaust air chamber;
   at least one second wall structure, mounted between the fan and the at least one supply air chamber structure, the at least one second wall structure formed by a plurality of stacked needle-fin tubes, forming a filter wall through which air is made to flow from the plurality of directions, and the at least one second wall structure forming a heat exchanger through which air is made to flow by the fan;

a heat carrier in the tube of each needle-fin tube, so that thermal energy is transferred from the heat carrier in the needle-fin tube through needle fins into the air, or in the opposite direction from the air into the heat carrier;

further comprising a separate connection chamber arranged to receive air from the exhaust air chamber.

11. An air conditioning device for conducting air from outside into a building or for conducting air from inside a building outside of the building, comprising:

at least one supply air chamber structure located external to a building, the supply air chamber structure having first wall structures forming a supply air chamber;

wherein the supply air chamber first wall structures have through flow gaps which are formed as gaps between the first wall structures, or openings that are formed in the first wall structures, such that air can be made to flow into the supply air chamber from under or above the first wall structures or through the openings formed in the first wall structures from a plurality of directions;

at least one exhaust air chamber structure forming an exhaust air chamber separated from the at least one supply air chamber structure by a partition wall therebetween;

a fan mounted to supply air to an opening defined by the partition wall, for causing air to flow between the supply air chamber and the exhaust air chamber;

at least one second wall structure, mounted between the fan and the at least one supply air chamber structure, the at least one second wall structure formed by a plurality of stacked needle-fin tubes, forming a filter wall through which air is made to flow from the plurality of directions, and the at least one second wall structure forming a heat exchanger through which air is made to flow by the fan;

a heat carrier in the tube of each needle-fin tube, so that thermal energy is transferred from the heat carrier in the needle-fin tube through needle fins into the air, or in the opposite direction from the air into the heat carrier;

wherein the supply air chamber has a floor formed by an inside of one of the at least one first wall structures, portions of the floor forming an opening, and wherein a fine filter structure which covers the opening and a valve or damper positioned beneath the fine filter structure, the opening leading to a building duct so that an airflow brought from outside the building duct can be combined in the supply chamber with air from the building duct so that a combined airflow is made to flow from the supply air chamber to the exhaust air chamber by the fan.

\* \* \* \* \*